(12) United States Patent
Corma Canos et al.

(10) Patent No.: US 7,947,252 B2
(45) Date of Patent: May 24, 2011

(54) MICROPOROUS CRYSTALLINE MATERIAL, ZEOLITE ITQ-33, METHOD OF PREPARATION AND USE

(75) Inventors: Avelino Corma Canos, Valencia (ES); Manuel Moliner Marin, Valencia (ES); Maria Jose Diaz Cabanas, Valencia (ES); Jose Manuel Serra Alfaro, Valencia (ES); Rafael Casteñeda Sanchez, Valencia (ES)

(73) Assignee: ExxonMobil Research and Engineering Company, Annandale, NJ (US)

( * ) Notice: Subject to any disclaimer, the term of this patent is extended or adjusted under 35 U.S.C. 154(b) by 656 days.

(21) Appl. No.: 11/795,432

(22) PCT Filed: Jan. 17, 2006

(86) PCT No.: PCT/ES2006/070002
§ 371 (c)(1),
(2), (4) Date: May 20, 2008

(87) PCT Pub. No.: WO2006/075041
PCT Pub. Date: Jul. 20, 2006

(65) Prior Publication Data
US 2009/0124484 A1 May 14, 2009

(30) Foreign Application Priority Data
Jan. 17, 2005 (ES) .................... 200500120

(51) Int. Cl.
*C01B 39/46* (2006.01)
*C01B 39/48* (2006.01)
*C01B 39/04* (2006.01)
*B01J 29/70* (2006.01)

(52) U.S. Cl. .......... 423/718; 423/704; 423/708
(58) Field of Classification Search .......... 423/704, 423/708, 718
See application file for complete search history.

(56) References Cited

U.S. PATENT DOCUMENTS

| | | | | |
|---|---|---|---|---|
| 4,676,958 A * | 6/1987 | Zones | ............ | 423/705 |
| 5,141,729 A * | 8/1992 | Chang et al. | ............ | 423/705 |
| 5,397,561 A * | 3/1995 | Smith | ............ | 423/704 |
| 6,471,941 B1 * | 10/2002 | Boix et al. | ............ | 423/707 |
| 7,008,612 B2 * | 3/2006 | Corma Canos et al. | ....... | 423/718 |
| 7,074,385 B2 * | 7/2006 | Harbuzaru et al. | ........... | 423/718 |
| 7,344,696 B2 * | 3/2008 | Canos et al. | ............ | 423/718 |
| 2003/0180217 A1 * | 9/2003 | Canos et al. | ............ | 423/718 |
| 2006/0036120 A1 * | 2/2006 | Corma Canos et al. | ...... | 585/467 |
| 2010/0093518 A1 * | 4/2010 | Lorgouilloux et al. | ......... | 502/62 |
| 2010/0197410 A1 * | 8/2010 | Leen et al. | ............ | 463/42 |

\* cited by examiner

*Primary Examiner* — David M Brunsman

(57) ABSTRACT

The invention relates to a microporous crystalline material which is characterised in that it has the following chemical composition in the calcined state: $X_2O_3$:n $YO_2$:m $GeO_2$, wherein (n+m) is equal to at least 5, X is a trivalent element, Y corresponds to one or more tetravalent elements other than Ge and the Y/Ge ratio is greater than 1. Moreover, in the synthesised form without calcination, said material has an X-ray diffraction pattern in which the main lines thereof are as follows: (1), in which (mf) represents relative intensity of between 80 and 100, "d" represents relative intensity of between 20 and 40 and "md" represents relative intensity of between 0 and 20, which is calculated as a percentage with respect to the most intense peak. The invention also relates to the method of preparing said material and the use thereof in the conversion of food products comprising organic compounds.

17 Claims, No Drawings

MICROPOROUS CRYSTALLINE MATERIAL, ZEOLITE ITQ-33, METHOD OF PREPARATION AND USE

FIELD OF TECHNOLOGY

The present application relates to a novel microporous crystalline material, ITQ-33, to the method of preparation thereof and to its use in the catalytic conversion of organic compounds.

BACKGROUND

The zeolites are porous crystalline aluminosilicates that have found important applications as catalysts, adsorbents and ion exchangers. Many of these zeolitic materials have well-defined structures that form channels and cavities within them of uniform size and shape that allow certain molecules to be adsorbed, whereas they prevent other molecules, that are too large to diffuse through the pores, from passing through to the interior of the crystal. This characteristic endows these materials with molecular sieve properties. The lattice of these molecular sieves can incorporate Si and other elements of group IIIA of the periodic table, all of them in tetrahedral coordination, with the tetrahedra joined at their vertices via oxygen atoms, forming a three-dimensional network. The negative charge generated by the group IIIA elements at lattice sites is compensated by the presence of cations in the crystal, for example cations of alkali metals or alkaline earth metals. A cation of one type can be exchanged totally or partially by cations of another type by techniques of ion exchange, so that the properties of a given silicate can be varied by selecting the desired cations.

Many zeolites have been synthesized in the presence of an organic molecule that acts as a structure-controlling agent. The organic molecules that act as structure-controlling agents (SCAS) generally include nitrogen in their composition, and can give rise to organic cations that are stable in the reaction mixture.

Mobilization of silica can be accomplished in the presence of OH$^-$ groups and a basic medium, which can be introduced as the hydroxide of said SCA, for example tetrapropylammonium hydroxide in the case of zeolite ZSM-5.

DESCRIPTION OF THE INVENTION

The present invention relates to a novel microporous crystalline material ITQ-33, which in its calcined form has a chemical composition represented by the formula:

$$X_2O_{3:n}\ YO_2{:}m\ GeO_2$$

in which (n+m) is at least 5, X is a trivalent element, Y represents one or more tetravalent elements other than Ge, and the ratio Y/Ge is greater than 1, and it has an X-ray diffraction pattern with the following principal lines for its uncalcined synthesized form:

| (d ± 0.2) (Å) | Relative intensity |
|---|---|
| 16.59 | vs |
| 11.63 | vw |
| 9.57 | vw |
| 8.31 | vw |
| 6.76 | vw |
| 4.81 | vw |
| 4.62 | vw |
| 4.27 | w |
| 3.64 | w |
| 3.15 | w | where "vs" denotes relative intensity 80-100, "w" denotes relative intensity 20-40 and "vw" denotes relative intensity 0-20, calculated as a percentage relative to the peak with greatest intensity.

The novel porous crystalline material can therefore be obtained in the absence of germanium.

This novel material, designated ITQ-33, both in its calcined form and uncalcined synthesized form, has an X-ray diffraction pattern that is different from that of other known zeolitic materials whose most important diffraction lines are given in Table 1 for the calcined form.

TABLE 1

| (d ± 0.2) (Å) | Relative intensity |
|---|---|
| 16.81 | vs |
| 11.50 | vw |
| 9.71 | vw |
| 8.41 | vw |
| 6.79 | vw |
| 4.84 | vw |
| 4.65 | vw |
| 4.24 | vw |
| 4.01 | vw |
| 3.84 | w |
| 3.81 | vw |
| 3.66 | vw |
| 3.36 | w |
| 3.17 | vw |
| 2.81 | vw |
| 2.56 | vw |
| 2.37 | vw |
| 2.27 | vw |

The interplanar spacings, d, were calculated in angstroms, and the relative intensity of the lines is calculated as a percentage relative to the peak of highest intensity, and is regarded as very strong (vs)=80-100, strong (s)=60-80, medium (m)=40-60, weak (w)=20-40, and very weak (vw)=0-20.

Preferred embodiments of ITQ-33 have, in their uncalcined form, the diffraction lines shown in Table 2.

TABLE 2

| (d ± 0.2) (Å) | Relative intensity |
|---|---|
| 16.59 | vs |
| 11.63 | vw |
| 9.57 | vw |
| 8.31 | vw |
| 6.76 | vw |
| 4.81 | vw |
| 4.62 | vw |
| 4.27 | w |
| 4.02 | vw |
| 3.86 | vw |
| 3.82 | vw |
| 3.64 | w |
| 3.33 | vw |
| 3.15 | w |

TABLE 2-continued

| (d ± 0.2) (Å) | Relative intensity |
|---|---|
| 2.78 | vw |
| 2.75 | vw |
| 2.54 | vw |
| 2.38 | vw |
| 2.27 | vw |

These diffraction patterns were obtained with a Philips X'Pert diffractometer equipped with a graphite monochromator and an automatic divergence slit using copper $K_\alpha$ radiation. The diffraction data were recorded with a step 2θ of 0.01° where θ is the Bragg angle and a count time of 10 seconds per step. The interplanar spacings, d, were calculated in angstroms, and the relative intensity of the lines is calculated as a percentage relative to the peak of highest intensity, and is regarded as very strong (vs)=80-100, strong (s)=60-80, medium (m)=40-60, weak (w)=20-40, and very weak (vw)=0-20.

It must be taken into account that the diffraction data listed for this sample as single or unique lines may be formed by multiple overlaps or superposition of reflections which, in certain conditions, such as differences in crystallographic changes, may appear as resolved or partially resolved lines. Generally, the crystallographic changes may include small variations in the parameters of the unit cell and/or changes in crystal symmetry, without producing a change in the structure. These modifications, which also include changes in relative intensities, may also be due to differences in the type and quantity of compensating cations, lattice composition, crystal size and habit, preferential orientation or the type of thermal or hydrothermal treatments that have been carried out.

The crystalline material preferably has, in its anhydrous, calcined form, a composition represented by:

$$X_2O_{3:n\ YO_2:m\ GeO_2}$$

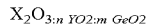

in which (n+m) is at least 5, and the value of n/m is at least 1, X represents one or more trivalent elements selected from the group comprising Al, B, In, Ga, Fe and Cr; and Y represents one or more tetravalent elements selected from Si, Sn, Ti, V.

In an especially preferred embodiment, the crystalline material has the formula stated previously in calcined form, in which X is selected from B, Al and a mixture of the two; and Y is Si.

It is clear from the values given that the crystalline material ITQ-33 can be synthesized in the absence of added trivalent elements.

The organic component of the material as synthesized can be removed, for example by extraction or by thermal treatment by heating to a temperature above 250° C. for a period of time between 2 minutes and 25 hours.

The compensating cations in the material in its uncalcined form, or after thermal treatment, can be replaced, if they are present, by other cations such as metal ions, $H^+$ and precursors of $H^+$, for example $NH_4^+$. Among the cations that can be introduced by ion exchange, those are preferred that can have a positive effect on the activity of the material as a catalyst, and more specifically cations such as $H^+$, cations of rare earths, and metals of group VIII, as well as of group IIA, IIIA, IVA, VA, IB, IIB, IIIB, IVB, VB, VIIB of the periodic table of the elements, are preferred.

The crystalline material of the present invention can also be combined intimately with hydrogenating-dehydrogenating components such as platinum, palladium, nickel, rhenium, cobalt, tungsten, molybdenum, vanadium, chromium, manganese, iron and combinations thereof. Introduction of these elements can take place in the crystallization stage, by exchange (if it occurs), and/or by impregnation, or by physical mixing. These elements can be introduced in their cationic form and/or from salts or other compounds which, on decomposition, generate the metallic or oxide component in its appropriate catalytic form.

The present invention also relates to a method of preparation of the crystalline material defined previously, comprising at least:
preparing a synthesis mixture that comprises at least $H_2O$, a source of one or more tetravalent elements Y and an organic compound as structure-controlling agent (R),
holding the synthesis mixture at a temperature between 80 and 200° C. until the crystals of the porous crystalline material form; and
recovering the crystalline material.

According to a preferred embodiment, the method of preparation of the crystalline material defined previously comprises at least:
preparing a synthesis mixture that comprises at least:
$H_2O$,
an oxide of one or more tetravalent elements Y,
and an organic compound as structure-controlling agent (R),
with molar ratios of oxides:

$H_2O/(YO_2)$ 1-50

$R/(YO_2)$ 0.1-3.0 holding the synthesis mixture at a temperature between 80 and 200° C. until the crystals of the porous crystalline material form; and
recovery of the crystalline material.

In this embodiment, and especially preferably, the molar ratios of oxides are:

$H_2O—(YO_2)$ 2-20

$R/(YO_2)$ 0.1-1.0

A further preferred embodiment of the method comprises:
preparing a synthesis mixture that comprises at least $H_2O$, a source of one or more tetravalent elements Y, a source of Ge and an organic compound as structure-controlling agent (R),
holding the synthesis mixture at a temperature between 80 and 200° C. until the crystals of the porous crystalline material form; and
recovering the crystalline material.

According to a preferred embodiment, the method of preparation of the crystalline material defined previously comprises at least:
preparing a synthesis mixture that comprises at least:
$H_2O$,
an oxide of one or more tetravalent elements Y,
oxide of Ge,
and an organic compound as structure-controlling agent (R),
with molar ratios of oxides:

$H_2O/(YO_2+GeO_2)$ 1-50

$R/(YO_2+GeO_2)$ 0.1-3.0

$YO_2/GeO_2$ greater than 1 holding the synthesis mixture at a temperature between 80 and 200° C. until the crystals of the porous crystalline material form; and recovery of the crystalline material.

In this embodiment, and especially preferably, the molar ratios of oxides are:

$H_2O/(YO_2+GeO_2)$ 2-20

$R/(YO_2+GeO_2)$ 0.1-1.0

$YO_2/GeO_2$ greater than 1

Another additional preferred embodiment of the method comprises at least:
preparing a synthesis mixture that comprises at least $H_2O$, a source of one or more trivalent elements X; a source of one or more tetravalent elements Y and an organic compound as structure-controlling agent (R),
holding the synthesis mixture at a temperature between 80 and 200° C. until the crystals of the porous crystalline material form; and
recovery of the crystalline material.

Another additional preferred embodiment of the method comprises at least:
preparing a synthesis mixture that comprises at least $H_2O$, an oxide of one or more trivalent elements X; an oxide of one or more tetravalent elements Y and an organic compound as structure-controlling agent (R), with molar ratios of oxides:

$YO_2/X_2O_3$ at least 5

$H_2O/YO_2$ between 1 and 50

$R/YO_2$ between 0.1 and 3.0 holding the synthesis mixture at a temperature between 80 and 200° C. until the crystals of the porous crystalline material form; and
recovery of the crystalline material.

According to the preceding embodiment, the preferred molar ratios of oxides are:

$YO_2/X_2O_3$ greater than 7

$H_2O/YO_2$ between 2 and 20

$R/YO_2$ between 0.1 and 1.0

Another preferred additional embodiment of the method comprises:
preparing a synthesis mixture that comprises at least $H_2O$, a source of one or more trivalent elements X; a source of one or more tetravalent elements Y, oxide of Ge, and an organic compound as structure-controlling agent (R),
holding the synthesis mixture at a temperature between 80 and 200° C. until the crystals of the porous crystalline material form; and
recovery of the crystalline material.

A further preferred embodiment of the method comprises:
preparing a synthesis mixture that comprises at least $H_2O$, an oxide of one or more trivalent elements X; an oxide of one or more tetravalent elements Y, oxide of Ge, and an organic compound as structure-controlling agent (R), with molar ratios of oxides:

$(YO_2+GeO_2)/X_2O_3$ greater than 5

$H_2O/(YO_2+GeO_2)$ between 1 and 50

$R/(YO_2+GeO_2)$ between 0.1 and 3.0

$YO_2/GeO_2$ greater than 1 holding the synthesis mixture at a temperature between 80 and 200° C. until the crystals of the porous crystalline material form; and
recovery of the crystalline material.

According to this embodiment, the molar ratios of oxides are preferably:

$(YO_2+GeO_2)/X_2O_3$ greater than 7

$H_2O/(YO_2+GeO_2)$ between 2 and 20

$R/(YO_2+GeO_2)$ between 0.1 and 1.0

$YO_2/GeO_2$ greater than 1

In any embodiment of the method of the present invention, crystals of zeolite ITQ-33 (up to 20 wt. %), which act as seed crystals, can be added to the synthesis mixture.

In any embodiment of the method of the present invention the organic compound used as structure-controlling agent is preferably selected from an amine and a tetraalkylammonium salt, preferably the hydroxide.

The method of the present invention, when production of the calcined crystalline material is intended, comprises a stage of removal of the organic matter trapped within the material, which can be carried out by extraction and/or thermal treatment at temperatures above 250° C. for a period of time between 2 minutes and 25 hours.

According to a further preferred embodiment of the method of the present invention, it comprises:
preparing a synthesis mixture that comprises at least $H_2O$, an oxide of one or more trivalent elements X selected from Al, B and a mixture of the two, an oxide of Si, oxide of Ge, a hexamethonium salt as R, with molar ratios of oxides:

$(SiO_2+GeO_2)/X_2O_3$ at least 5

$H_2O/(SiO_2+GeO_2)$ between 1 and 50

$R/(SiO_2+GeO_2)$ between 0.1 and 3.0

$SiO_2/GeO_2$ greater than 1 holding the synthesis mixture at a temperature between 80 and 200° C. until the crystals of the porous crystalline material form; and
recovery of the crystalline material.

The crystallization of ITQ-33 can be carried out in static conditions or with stirring, in autoclaves at a temperature between 80 and 200° C., for times sufficient to achieve crystallization, for example between 12 hours and 60 days.

On completion of the crystallization stage, the crystals of ITQ-33 are separated from the mother liquor, and are recovered. It must be borne in mind that the components of the synthesis mixture can come from different sources, and the crystallization times and conditions can vary depending on these. For the purpose of facilitating synthesis, crystals of ITQ-33 can be added as seeds, in amounts of up to 20 wt. % relative to the total of oxides, to the synthesis mixture. These can be added before or during crystallization of ITQ-33.

The material produced by means of this invention can be pelletized in accordance with known techniques, and can be used in catalytic cracking of hydrocarbons, catalytic hydrocracking of hydrocarbons, alkylation of aromatics with olefins and in processes of esterification, acylation, reaction of aniline with formaldehyde in its acid form and/or exchange with suitable cations. Preferably the material is present as a component of other catalysts.

The present invention further relates to a method of converting feeds formed from organic compounds, characterized in that it comprises bringing said feed into contact with an active form of the porous crystalline material of the invention.

Preferably said method is selected from catalytic cracking of hydrocarbons, catalytic hydrocracking of hydrocarbons, alkylation of aromatics with olefins, esterification, acylation and reaction of aniline with formaldehyde, and comprises the pelletization of the material in a form selected from its acid form, exchange with cations and a combination of the two. Even more preferably, said material is present as a component of catalysts.

EXAMPLES

Example 1

Synthesis of ITQ-33

Dissolve 0.174 g of $GeO_2$ in 0.373 g of a solution of hexamethonium hydroxide (16.3 wt. %) and 0.843 g of solution of hexamethonium bromide (50 wt. %). Add 6.8 mg of $Al_2O_3$ and 0.533 g of Ludox AS-40 to the previous solution, leaving the synthesis mixture to evaporate while stirring until the final composition is reached:

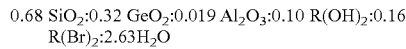

0.68 $SiO_2$:0.32 $GeO_2$:0.019 $Al_2O_3$:0.10 $R(OH)_2$:0.16 $R(Br)_2$:2.63$H_2O$ where R is hexamethonium.

Heat the gel for 4 days in Teflon-lined steel autoclaves at 175° C. in static conditions. The solid obtained after filtration, washing with distilled water and drying at 100° C. is ITQ-33. Calcine the material at 540° C. for 3 hours in an air stream to remove the organic matter. The X-ray powder diffraction pattern of the solid obtained coincides with the values in Table 1.

Example 2

Dissolve 0.174 g of $GeO_2$ in 0.353 g of a solution of hexamethonium hydroxide (16.6 wt. %) and 0.895 g of solution of hexamethonium bromide (50 wt. %). Add 7.3 mg of $Al_2O_3$ and 0.542 g of Ludox AS-40 to the previous solution, stirring the synthesis mixture until the following composition is reached by evaporation:

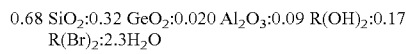

0.68 $SiO_2$:0.32 $GeO_2$:0.020 $Al_2O_3$:0.09 $R(OH)_2$:0.17 $R(Br)_2$:2.3$H_2O$ where R is hexamethonium.

Heat the gel for 14 days in Teflon-lined steel autoclaves at 175° C. in static conditions. The solid obtained after filtration, washing with distilled water and drying at 100° C. is ITQ-33.

Example 3

Dissolve 0.174 g of $GeO_2$ in 0.359 g of solution of hexamethonium hydroxide (16.3 wt. %) and 0.824 g of solution of hexamethonium bromide (50 wt. %). Add 0.151 g of solution of $H_3BO_3$ (5 wt. %) and 0.497 g of Ludox AS-40 to the solution obtained, and leave to evaporate, while stirring, until the synthesis mixture reaches the composition:

0.66 $SiO_2$:0.34 $GeO_2$:0.025 $B_2O_3$:0.10 $R(OH)_2$:0.16 $R(Br)_2$:3.13$H_2O$ where R is hexamethonium.

Heat the gel for 5 days in Teflon-lined steel autoclaves at 175° C. in static conditions. The solid obtained after filtration, washing with distilled water and drying at 100° C. is zeolite ITQ-33.

Example 4

Dissolve 0.174 g of $GeO_2$ in 0.381 g of solution of hexamethonium hydroxide (15.4 wt. %) and 0.854 g of solution of hexamethonium bromide (50 wt. %). Add 7.0 mg of $Al_2O_3$ and 0.516 g of Ludox AS-40 to the solution obtained, and leave to evaporate, while stirring, until the mixture reaches the composition:

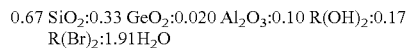

0.67 $SiO_2$:0.33 $GeO_2$:0.020 $Al_2O_3$:0.10 $R(OH)_2$:0.17 $R(Br)_2$:1.91$H_2O$ where R is hexamethonium.

Heat the gel for 8 days in Teflon-lined steel autoclaves at 175° C. in static conditions. The solid obtained after filtration, washing with distilled water and drying at 100° C. is zeolite ITQ-33.

Example 5

Dissolve 0.174 g of $GeO_2$ in 0.384 g of a solution of hexamethonium hydroxide (15.4 wt. %) and 0.897 g of solution of hexamethonium bromide (50 wt. %). Add 11.2 mg of $Al_2O_3$ and 0.515 g of Ludox AS-40 to the previous solution, and leave the mixture to evaporate, while stirring, until the final composition is reached:

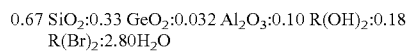

0.67 $SiO_2$:0.33 $GeO_2$:0.032 $Al_2O_3$:0.10 $R(OH)_2$:0.18 $R(Br)_2$:2.80$H_2O$ where R is hexamethonium.

Heat the gel for 8 days in Teflon-lined steel autoclaves at 175° C. in static conditions. The solid obtained after filtration, washing with distilled water and drying at 100° C. is ITQ-33.

Example 6

Dissolve 0.174 g of $GeO_2$ in 0.317 g of solution of hexamethonium hydroxide (18.3 wt. %) and 0.830 g of solution of hexamethonium bromide (50 wt. %). Add 6.9 mg of $Al_2O_3$ and 0.513 g of Ludox AS-40 to the solution obtained, and leave to evaporate, while stirring, until the mixture reaches the composition:

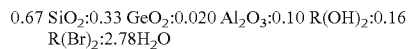

0.67 $SiO_2$:0.33 $GeO_2$:0.020 $Al_2O_3$:0.10 $R(OH)_2$:0.16 $R(Br)_2$:2.78$H_2O$ where R is hexamethonium.

Heat the gel for 25 days in Teflon-lined steel autoclaves at 150° C. in static conditions. The solid obtained after filtration, washing with distilled water and drying at 100° C. is zeolite ITQ-33.

Example 7

Dissolve 0.176 g of $GeO_2$ in 0.322 g of solution of hexamethonium hydroxide (18.3 wt. %) and 0.882 g of solution of hexamethonium bromide (50 wt. %). Add 0.122 g of solution of $H_3BO_3$ (5 wt. %) and 0.525 g of Ludox AS-40. Leave the mixture to evaporate, while stirring, until the reaction mixture reaches a final composition:

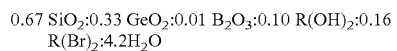

0.67 $SiO_2$:0.33 $GeO_2$:0.01 $B_2O_3$:0.10 $R(OH)_2$:0.16 $R(Br)_2$:4.2$H_2O$ where R is hexamethonium.

Heat the gel at 175° C. in static conditions for 14 days in Teflon-lined steel autoclaves. The solid obtained after filtration, washing with distilled water and drying at 100° C. is a mixture of the phases ITQ-33 and ITQ-24.

Example 8

Dissolve 0.174 g of GeO$_2$ in 0.320 g of solution of hexamethonium hydroxide (18.3 wt. %) and 0.823 g of solution of hexamethonium bromide (50 wt. %). Add 0.311 g of solution of H$_3$BO$_3$ (5 wt. %) and 0.507 g of Ludox AS-40 to the solution obtained, and leave to evaporate, while stirring, until the mixture reaches the composition:

0.67 SiO$_2$:0.33 GeO$_2$:0.025 B$_2$O$_3$:0.10 R(OH)$_2$:0.15 R(Br)$_2$:4.7H$_2$O where R is hexamethonium.

Heat the gel for 14 days in Teflon-lined steel autoclaves at 175° C. in static conditions. The solid obtained after filtration, washing with distilled water and drying at 100° C. is a mixture of the phases ITQ-33 and ITQ-24.

Example 9

Dissolve 0.105 g of GeO$_2$ in 0.586 g of solution of hexamethonium hydroxide (17.6 wt. %) and 0.239 g of solution of hexamethonium bromide (50 wt. %). Add 0.010 g of Al$_2$O$_3$ and 0.303 g of Ludox AS-40. Finally add 0.332 g of solution of ammonium fluoride (10 wt. %) and leave the mixture to evaporate, while stirring, until the reaction mixture reaches a final composition:

0.67 SiO$_2$:0.33 GeO$_2$:0.025 Al$_2$O$_3$:0.15 R(OH)$_2$:0.10 R(Br)$_2$:0.30 NH$_4$F:3H$_2$O where R is hexamethonium.

Add 0.018 g. of crystals of ITQ-33 and homogenize the mixture. Heat the gel at 175° C. in static conditions for 20 hours in Teflon-lined steel autoclaves. The solid obtained after filtration, washing with distilled water and drying at 100° C. is ITQ-33.

The invention claimed is:

1. A porous crystalline material, characterized in that it has a chemical composition in the calcined form represented by the formula:

X$_2$O$_3$:n YO$_2$ :m GeO$_2$ in which (n +m) is at least 5, X is a trivalent element, Y represents one or more tetravalent elements other than Ge, and the ratio Y/Ge is greater than 1, and has a X-ray diffraction pattern whose principal lines for its uncalcined synthesized form are

| (d ± 0.2) (Å) | Relative intensity |
|---|---|
| 16.59 | vs |
| 11.63 | vw |
| 9.57 | vw |
| 8.31 | vw |
| 6.76 | vw |
| 4.81 | vw |
| 4.62 | vw |
| 4.27 | w |
| 3.64 | w |
| 3.15 | w | in which "vs" denotes relative intensity 80-100, "w" denotes relative intensity 20-40 and "vw" denotes relative intensity 0-20, calculated as a percentage relative to the peak with greatest intensity.

2. The porous crystalline material as claimed in claim 1, characterized by an X-ray diffraction pattern whose principal lines for its calcined form are:

| (d ± 0.2) (Å) | Relative intensity |
|---|---|
| 16.81 | vs |
| 11.50 | vw |
| 9.71 | vw |
| 8.41 | vw |
| 6.79 | vw |
| 4.84 | vw |
| 4.65 | vw |
| 4.24 | vw |
| 4.01 | vw |
| 3.84 | w |
| 3.81 | vw |
| 3.66 | vw |
| 3.36 | w |
| 3.17 | vw |
| 2.81 | vw |
| 2.56 | vw |
| 2.37 | vw |
| 2.27 | vw | where "vs", "w" and "vw" have the meanings stated in claim 1.

3. The crystalline material as claimed in one of claim 1 or 2, characterized in that X represents one or more trivalent elements selected from the group comprising Al, B, In, Ga, Fe and Cr; and Y represents one or more tetravalent elements selected from Si, Sn, Ti, V.

4. The crystalline material as claimed in claim 3, characterized in that X is selected from B, Al and a mixture of the two; and Y is Si.

5. A catalyst, characterized in that it comprises the material as claimed in claim 1, combined with hydrogenating-dehydrogenating components.

6. The catalyst as claimed in claim 5, characterized in that said hydrogenating-dehydrogenating components are selected from platinum, palladium, nickel, rhenium, cobalt, tungsten, molybdenum, vanadium, chromium, manganese, iron and combinations thereof.

7. A method of synthesis of the crystalline material claimed in claim 1, characterized in that it comprises at least:
preparing a synthesis mixture that comprises at least H$_2$O, a source of one or more trivalent elements X; a source of one or more tetravalent elements Y, oxide of Ge, and an organic compound as structure-controlling agent (R), holding the synthesis mixture at a temperature between 80 and 200° C. until the crystals of the porous crystalline material form; and
recovery of the crystalline material.

8. The method as claimed in claim 7, characterized in that it comprises:
preparing a synthesis mixture that comprises at least H$_2$O, an oxide of one or more trivalent elements X; an oxide of one or more tetravalent elements Y, oxide of Ge, and an organic compound as structure-controlling agent (R), with molar ratios of oxides:
(YO$_2$ +GeO$_2$)/X$_2$O$_3$ at least 5
H$_2$O/(YO$_2$ +GeO$_2$) between 1 and 50
R/(YO$_2$ +GeO$_2$) between 0.1 and 3.0
YO$_2$/GeO$_2$ greater than 1
holding the synthesis mixture at a temperature between 80 and 200° C. until the crystals of the porous crystalline material form; and
recovery of the crystalline material.

9. The method as claimed in claim 8, characterized in that the molar ratios of oxides are:

$(YO_2 + GeO_2)/X_2O_3$ greater than 7
$H_2O/(YO_2 + GeO_2)$ between 2 and 20
$R/(YO_2 + GeO_2)$ between 0.1 and 1.0
$YO_2/GeO_2$ greater than 1.

10. The method as claimed in claim 7, characterized in that crystals of zeolite ITQ-33, which act as seed crystals, are added to the synthesis mixture.

11. The method as claimed in claim 10, characterized in that said crystals of zeolite ITQ-33 that act as seed are added in a proportion up to 20 wt.% relative to the total weight of oxides.

12. The method as claimed in claim 7, characterized in that the organic compound used as structure-controlling agent is selected from an amine and a tetraalkylammonium salt.

13. The method as claimed in claim 7, characterized in that the organic compound used as structure-controlling agent is hexamethonium hydroxide.

14. The method as claimed in claim 7, characterized in that it comprises:

preparing a synthesis mixture that comprises at least $H_2O$, an oxide of one or more trivalent elements X selected from Al, B and a mixture of the two, an oxide of Si, oxide of Ge, a hexamethonium salt as structure-controlling agent R, with molar ratios of oxides:

$(SiO_2 + GeO_2)/X_2O_3$ at least 5
$H_2O/SiO_2 + GeO_2)$ between 1 and 50
$R/(SiO_2 + GeO_2)$ between 0.1 and 3.0
$SiO_2/GeO_2$ greater than 1 holding the synthesis mixture at a temperature between 80 and 200° C. until the crystals of the porous crystalline material form; and recovery of the crystalline material.

15. The method as claimed in claim 7, characterized in that it comprises a stage of removal of the organic matter trapped inside the material, which is carried out by extraction, thermal treatment at temperatures above 250° C. for a period of time between 2 minutes and 25 hours, or a combination of the two.

16. A method for the conversion of feeds comprising organic compounds comprising contacting said feeds with a catalyst comprising the porous crystalline material of claim 1.

17. The method as claimed in claim 16, characterized in that said conversion is selected from catalytic cracking of hydrocarbons, catalytic hydrocracking of hydrocarbons, alkylation of aromatics with olefins, esterification, acylation and reaction of aniline with formaldehyde, and which comprises pelletization of the material in a form selected from its acid form, exchange with cations and a combination of the two.

* * * * *